May 20, 1969

K. W. RESH ET AL 3,445,197

REMOVING BENZENE FROM AQUEOUS MURIATIC ACID
USING A LIQUID PARAFFIN

Filed May 27, 1966

INVENTORS
KYLE W. RESH
JACK N. YARBROUGH

BY R.B.Coleman

ATTORNEY

United States Patent Office 3,445,197
Patented May 20, 1969

3,445,197
REMOVING BENZENE FROM AQUEOUS MURIATIC ACID USING A LIQUID PARAFFIN
Kyle W. Resh, Rosedale, Md., and Jack N. Yarbrough, Wilmington, Del., assignors to Continental Oil Company, Ponca City, Okla., a corporation of Delaware
Filed May 27, 1966, Ser. No. 553,452
Int. Cl. B01f 9/02, 9/00
U.S. Cl. 23—312                    11 Claims

---

ABSTRACT OF THE DISCLOSURE

A method for removing benzene impurities from an aqueous hydrogen halide solution resulting from such processes as alkylation of aromatics. The benzene is extracted in the liquid phase from the aqueous solution using a liquid aliphatic paraffin or cycloparaffin or their halogenated homologues.

---

This invention relates to removal of aromatics from muriatic (hydrochloric) acid. In one of its aspects, this invention relates to the recovery of high purity muriatic acid by-product from alkylation of benzene with chlorinated paraffins.

It is known in the art to alkylate aromatics such as benzene with haloparaffins, particularly chloroparaffins, to form phenylalkanes. In general, these alkylates are formed from monochlorinated paraffins of 10 to 14 carbon atoms since such alkylates are particularly useful as intermediates for detergents; however, broadly speaking, such alkylates can be prepared from chloroparaffins generally. The aromatics, particularly benzene, will attach to the paraffin by replacing the Cl and giving up HCl as a by-product. Some benzene will remain unreacted and will leave the system with the HCl. This HCl is frequently recovered as muriatic acid by passing the gases into demineralized water. Unfortunately, benzene is also slightly soluble in water and such acids are not suitable for many uses. To remove the benzene, it has been the practice to contact the off gas with a countercurrent flow of chloroparaffins to remove a substantial portion of the benzene and pass the chloroparaffins to the alkylation step. The HCl gases, still containing some benzene, is then passed through a bed of absorbent, such as activated charcoal, to remove the remaining benzene. The HCl is then adsorbed in water to form muriatic acid.

The above system has at least two disadvantages. First, the chloroparaffins treatment leaves a substantial amount of benzene in the HCl gas, thus limiting the effective life of the charcoal in the adsorber. More seriously, the adsorption is exothermic and when a freshly charged adsorber is put on stream, extremely high temperatures are reached and since the charcoal cannot be fully stripped of adsorbed oxygen, a fire hazard is created. In fact, it is well known that several such fires have resulted from this treatment.

It is, therefore, an object of this invention to provide a means of removing aromatics from muriatic acid.

Another object of this invention is to provide a safe means of recovering high purity halogen acid as a by-product from alkylation of aromatics with a halogenated paraffin.

Another object of this invention is to provide a method of recovering high purity muriatic acid from the alkylation of benzene with a chloroparaffin.

These and other objects of this invention are broadly obtained by contacting an aqueous solution of the halo-acid contaminated with an aromatic hydrocarbon with a paraffin or halogenated paraffin.

As has been indicated, this invention is applicable to aqueous solutions of a hydrogen halide such as HCl, HF, HI, and HBr. These gases are soluble over a wide range and can be supersaturated. However, we are particularly concerned with aqueous solutions up to the saturation point.

The aromatic contaminants would include benzene, naphthalene, alkyl substituted benzene and naphthalene such as toluene, methyl-3 ethyl benzene, methyl naphthalene, methyl, 4-butyl naphthalene and the like. Primarily, benzene is the contaminant most often found, and is somewhat more soluble than these other aromatics in water.

Of the aliphatic paraffins which are useful, we prefer those having at least 6 carbon atoms since these are insoluble in water. Preferably, we use normal paraffins of 10 to 14 carbon atoms since these are the ones of primary interest in alkylation; however, any liquid paraffin will be operable. The paraffin can be branched chain or cyclic. Thus, the operable paraffin would include hexane, octane, nornane, decane, dodecane, tridecane, tetradecane, pentadecane, 3-methyl hexane, 2-methyl pentane, 4-butyl octane, 2,-4-dimethyl heptane,2-methyl-4 ethyl oxane and the like. Of the cycloparaffins we can use, any cycloparaffin which is liquid at the operating conditions, but we generally prefer cyclohexane since it is readily available. Although cyclopropane, cyclohexane, cycloheptane and the like are operable.

As has been mentioned, these paraffins can be halo-substituted; however, again we prefer the monochloro-n-paraffins containing 10 to 14 carbon atoms, e.g., 2- chlorodecane, 4-chloroundecane, 5-chlorododecane, 6-chlorotridecane, 7-chlorotetradecane and the like. Similar halogenated paraffins with such halogen as iodine, fluorine, and bromine are also operable as are halogenated cycloparaffins and isoparaffins of the class previously mentioned.

As will be obvious to one skilled in the art, the effectiveness of the treatment will be somewhat dependent upon temperature and volume ratio of solvent to acid. It should also be obvious that the degree of agitation, or rather surface interface contact, is very important. That is, the greater the interface surface, the better the separation. On the other hand, we have found that excessive agitation promotes foaming and emulsions. These emulsions are not stable and will break down upon standing. It the agitation required to effect separation is particularly severe, then holding vessels can be employed to allow sufficient time for the emulsion to break. In general, we prefer a solvent to acid ratio from 1:4 to 1:1; however, greater or lesser amounts of solvent to acid can be used.

While it is possible to remove all of the aromatic from the acid in the paraffin contact step, the volume ratio of paraffins to acid would necessarily be high and the residence time prolonged, or additional contact stages would be required. Therefore, we prefer to lower the aromatic content in this step to 10 to 20 parts per million parts of acid and remove this final aromatic content by passing the acid over a selective absorbent such as zeolite, silica gel or the like and preferably activated charcoal. It is, of course, within the scope of the invention to reactivate the charcoal by selective desorbing, steam stripping or heat treatment.

The invention will be further described with reference to the figures of which:

The figure is a schematic flow diagram incorporating this invention in the recovery of HCl from an alkylation process.

In the drawings, valves, heaters, instruments, coolers, pumps and the like are omitted since all of this is part of the prior art. In the benzene adsorber, reflux can be employed if desired. It could be a tray tower, packed bed, or any suitable vessel for contactiing the streams. Where a gas stream is contacted with a liquid, a sparger introducing the gas in fine streams can be employed. The acid-paraffin contacting vessel can be of any suitable type, such as agitated vessels, packed towers, spray towers, or tray towers.

Referring now to the figures, a stream comprising alkylated benzene, HCl and unreacted benzene from alkylation unit (not shown) is passed via conduit 4 to benzene adsorber 5 wherein this gas is countercurrently contacted with liquid n-paraffins or chloroparaffin introduced via conduit 6. The n-paraffins (or chloroparaffins, we will use n-paraffins in this description) will remove part of the benzene and is removed via conduit 7 and sent to the alkylation section (not shown). The HCl still containing some benzene is taken overhead via conduit 8 and is passed to muriatic acid HCl adsorber 9. Alternatively, the HCl-benzene stream to adsorber 5 can be passed directly to the muriatic acid vessel 9 via conduit 10 and by opening and closing valves to direct the flow. In either case, a demineralized water is passed into vessel 9 via conduit 11 and reacts with the HCl to form hydrochloric acid, and this acid is diluted to the desired strength with additional water to form the muriatic acid. The muriatic acid will absorb at least a portion of the benzene, generally in the range 100–200 p.p.m. based on the acid and is passed via conduit 13 to surge drum 25. Any unabsorbed benzene can be bled off via conduit 12 and returned to benzene storage (not shown). The benzene contaminated acid is passed via conduit 13a to vessel 14 wherein it is dispersed in n-paraffins introduced to the vessel via conduit 15. The contacting is aided by means of agitation 16 driven via motor 17. The stream then passes to the separator 26 via conduit 27. The normal paraffins will reduce the benzene content of the acid down to 10–20 p.p.m. and the n-paraffins with the absorbed benzene passes via conduit 18 to storage. The muriatic acid, now containing less than about 20 p.p.m. of benzene is withdrawn from separator 26 and passed via conduit 22 to activated charcoal adsorber 23 wherein the charcoal will remove substantially all of the remaining benzene. The muriatic acid containing less than about 1 p.p.m. benzene is removed from vessel 23 via conduit 24 and sent to storage (not shown). Alternatively, the benzene contaminated muriatic acid from the surge drum can be contacted with a chloroparaffin of the type to be used in alkylation in lieu of n-paraffins and the chloroparaffin containing adsorbed benzene withdrawn from separator 26 via conduit 18 is sent directly to storage.

Examples

To further describe our invention, the following examples are given.

Example I

Plant produced 20° Bé. hydrochloric acid was saturated with benzene and diluted with additional 20° Bé. acid to a final acid containing 265 parts benzene per million parts acid.

Equal parts of the acid and a mixture to $C_{12}$–$C_{14}$ paraffins (1:1) were added to a large globe-type separatory funnel. The mixture was stirred for 5 minutes and then the contents allowed to stand 15 minutes. A small sample of the acid layer was removed for organic analysis and the results are shown as 1st extraction in Table I. The contents were again stirred for 5 minutes and then allowed to stand again for 15 minutes. A sample of acid was removed for organic analysis and the results are shown as 2nd extraction in the table. This was repeated for the third time and the organic analysis is reported as 3rd extraction in the table.

TABLE I

| Paraffin extraction sample | Benzene (p.p.m.) | Other hydrocarbons (p.p.m.) |
|---|---|---|
| Starting acid | 265 | None |
| 1st extraction | 0.14 | 0.46 |
| 2nd extraction | 0.12 | None |
| 3rd extraction | 0.12 | None |

This data shown in Table I clearly shows that paraffins will extract benzene from muriatic acid.

Example II

To show the effect of different benzene loadings and temperatures on the extraction, the above procedure was followed except that the mixture consisted of one volume part $C_{10}$–$C_{12}$ paraffins to 4 volume parts acid and the mixture was intermittently agitated over a period of 6 hours and then let stand for 10 hours. In one run, the temperature was controlled at 76° F. and in the other, the temperature was controlled at 125° F. The data is tabulated in Table II (76° F.) and Table III (125° F.).

TABLE II

| Analysis of the benzene-spiked 20° Be acid before paraffin extraction at 76° F., p.p.m. by wt. | | | | Analysis of acid after extraction, p.p.m. by wt. | | | | Benzene content of paraffin after extraction, wt. percent benzene |
|---|---|---|---|---|---|---|---|---|
| Benzene | Paraffins | | | Benzene | Paraffins | | | |
| | $C_{10}$ | $C_{11}$ | $C_{12}$ | | $C_{10}$ | $C_{11}$ | $C_{12}$ | |
| 13.19 | 0.12 | 0.4 | | 5.3 | 0.6 | 0.5 | 1.0 | 0.02 |
| 56.7 | 0.02 | 0.57 | 0.67 | 3.3 | 0.6 | 0.6 | 2.2 | 0.04 |
| 93 | | | Trace | 3.4 | 0.4 | 0.6 | 1.3 | 0.06 |
| 173 | | | Trace | 4.6 | 0.1 | 0.4 | 1.6 | 0.12 |
| 400 | | | 0.2 | 11.9 | 0.2 | 1.2 | 1.8 | 0.28 |
| 747 | | | Trace | 21.3 | 0.1 | 0.8 | 1.5 | 0.57 |

TABLE III

| Analysis of the benzene-spiked 20° Be acid before paraffin extraction at 125° F., p.p.m. by wt. | Analysis of acid after extraction, p.p.m. by wt. | | | | Benzene content of paraffin after extraction, wt. percent benzene |
|---|---|---|---|---|---|
| | Benzene | Paraffins | | | |
| | | $C_{10}$ | $C_{11}$ | $C_{12}$ | |
| 261 | 5.9 | 0.09 | 0.18 | | 0.12 |
| 468 | 14.3 | 0.08 | 0.32 | 0.32 | 0.27 |
| 764 | 19.8 | 0.08 | 0.28 | 0.32 | 0.52 |

From the above tables, it can be seen that the temperature had little effect on benzene extraction.

Example III

Several runs were repeated using the method of Example I except the volume ratio of acid to benzene was varied. The tests were made at 78° F. and at atmospheric pressure. The results are shown in Table IV. The initial acid was saturated with about 1,000 p.p.m. benzene.

TABLE IV

| Run | Volume acid | Volume paraffins | Organics in acid phase | |
|---|---|---|---|---|
| | | | Benzene, p.p.m. | Paraffins p.p.m. |
| 1 | 4 | 1 | 17 | Trace |
| 2 | 2 | 1 | 12 | Trace |
| 3 | 1 | 1 | 7 | Trace |

From Table IV, it can be seen that increasing the paraffin to acid ratio improves the separation.

Example IV

A plant scale run was made wherein the HCl-benzene from the alkylation units was first contacted with the chloroparaffin feed and the HCl-benzene then adsorbed in demineralized water to produce muriatic acid which upon analysis showed 162 p.p.m. benzene, 37 p.p.m. $C_9$, 417 p.p.m. $C_{10}$, 403 p.p.m. $C_{11}$, 103 p.p.m. $C_{12}$ and 2 p.p.m. $C_{13}$ paraffins, all parts being weight parts based on the acid. This acid was fed into the top of a contact vessel, not packed, and $C_{10}$–$C_{13}$ paraffins were sparged into the bottom of the tower. The paraffins were removed from the top of the separator and the extracted muriatic acid was removed from the bottom of said separator. This acid analyzed 5.5 p.p.m. benzene, 3 p.p.m. $C_9$, 75.8 p.p.m. $C_{10}$, 226.8 p.p.m. $C_{11}$, 231.9 p.p.m. $C_{12}$ and 64 p.p.m. $C_{13}$ paraffins. The acid was then percolated through an activated charcoal bed and analyzed less than 0.2 p.p.m. total organics and less than 0.1 p.p.m. benzene.

This example clearly shows that muriatic acid can be cleaned by first contacting same with paraffins and subsequently cleaning up with charcoal. While it is possible to clean up the acid without first extracting with a paraffinic material, the effective life of the activated charcoal can be greatly increased by first reducing the benzene content by extraction.

While the invention has been described in terms of removing benzene from muriatic acid with a normal aliphatic paraffin, the method illustrated is broadly applicable to removing aromatics from halogen acids with any of the paraffins and/or halogenated paraffins as disclosed supra.

Having thus described the invention, we claim:

1. A method of removing benzene impurities from a liquid aqueous solution of a hydrogen halide which comprises contacting said liquid aqueous acid solution with an extraction liquid selected from the group consisting of aliphatic paraffins and cycloparaffins of at least 6 carbon atoms, and such paraffins or cycloparaffins having a halogen substituent thereon and separating the aqueous acid phase from the oil phase.

2. The method of claim 1 wherein the volume ratio of said acid to said extraction liquid being in the range 1:1 to 4:1.

3. The method of claim 1 wherein said acid is muriatic acid.

4. The method of claim 3 wherein the volume ratio of muriatic acid to extraction liquid is in the range of 1:1 to 4:1.

5. The method of claim 4 wherein said extraction liquid is a normal paraffin.

6. The method of claim 5 wherein the aqueous phase is subsequently contacted with an adsorbent effective for the adsorption of residual benzene.

7. The method of claim 6 wherein said adsorbent is activated charcoal.

8. The method of claim 4 wherein said extraction liquid is a monochloroparaffin.

9. The method of claim 8 wherein the liquid aqueous acid phase is subsequently contacted with an adsorbent.

10. The method of claim 9 wherein said adsorbent is activated charcoal.

11. The process of recovering by-product HCl from alkylation of benzene with a chlorinated paraffin which comprises separating said by-product HCl and unreacted benzene from product, contacting said by-product HCl and unreacted benzene with feedstream of said chlorinated paraffins, thereby removing a portion of said benzene, dissolving the HCl and remaining benzene in demineralized water to form muriatic acid having benzene dissolved therein, the improvement comprising contacting said muriatic acid with a liquid aliphatic paraffin of at least 6 carbon atoms thereby removing additional benzene, separating the aqueous muriatic acid phase from the oil phase, and passing the thus separated muriatic acid over activated charcoal to remove substantially all of the remaining benzene.

References Cited

UNITED STATES PATENTS

| 1,758,351 | 5/1930 | Cambell | 23—154 X |
| 2,271,866 | 2/1942 | Liston | 23—154 |
| 2,402,978 | 7/1946 | Allen | 23—154 |
| 2,558,011 | 6/1951 | Sprauer | 23—154 |
| 2,852,582 | 9/1958 | Stallings | 23—154 X |
| 3,192,128 | 6/1965 | Brandmair | 23—154 X |
| 3,254,048 | 5/1966 | Schaub | 23—312 X |

FOREIGN PATENTS 570,870   7/1945   Great Britain.

OTHER REFERENCES

Wilson: Chemical Engineering, vol. 58, No. 7, July 1951, pp. 284 to 287.

NORMAN YUDKOFF, *Primary Examiner.*

S. J. EMERY, *Assistant Examiner.*

U.S. Cl. X.R.

260—671, 674, 705